(12) United States Patent
Bajko

(10) Patent No.: US 10,869,232 B2
(45) Date of Patent: Dec. 15, 2020

(54) METHOD AND APPARATUS FOR ADVERTISING CHANNEL SWITCH TIME IN A WIRELESS TRANSMISSION SYSTEM

(71) Applicant: MediaTek Singapore Pte. Ltd., Solaris (SG)

(72) Inventor: Gabor Bajko, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/178,433

(22) Filed: Nov. 1, 2018

(65) Prior Publication Data

US 2019/0223056 A1    Jul. 18, 2019

Related U.S. Application Data

(60) Provisional application No. 62/617,657, filed on Jan. 16, 2018.

(51) Int. Cl.
| | |
|---|---|
| *H04W 4/00* | (2018.01) |
| *H04W 72/00* | (2009.01) |
| *H04W 36/00* | (2009.01) |
| *H04W 36/06* | (2009.01) |
| *H04W 48/12* | (2009.01) |
| *H04W 16/14* | (2009.01) |
| *H04W 36/30* | (2009.01) |

(52) U.S. Cl.
CPC ........ *H04W 36/0011* (2013.01); *H04W 36/06* (2013.01); *H04W 48/12* (2013.01); *H04W 16/14* (2013.01); *H04W 36/0055* (2013.01); *H04W 36/30* (2013.01)

(58) Field of Classification Search
CPC ....... H04W 4/14; H04W 16/12; H04W 24/00; H04W 48/16; H04W 60/00; H04W 72/04
USPC ....... 455/434, 435.1, 450–451, 452.1–452.2, 455/455, 466
See application file for complete search history.

(56) References Cited

U.S. PATENT DOCUMENTS

2003/0171116 A1* 9/2003 Soomro ............... H04W 72/08
455/434
2012/0314663 A1   12/2012 Dwivedi et al.
(Continued)

FOREIGN PATENT DOCUMENTS

| WO | 03075513 A1 | 9/2003 |
| WO | 2007100323 A1 | 9/2007 |
| WO | WO-2014183400 A1 * | 11/2014 |

OTHER PUBLICATIONS

Gabor Bajko; et al, CSA with channel switch time announcement, IEEE P802.11, Wireless LANs, doc.: IEEE 802.11-yy/xxxxr02, Jan. 2018, pp. 1-4, XP068122994.

*Primary Examiner* — Matthew W Genack

(57) ABSTRACT

Embodiments of the present invention provide a method and apparatus for announcing the expected delay period between when a wireless AP stops transmitting on a first channel and begins transmitting on a second channel. After the last beacon frame is send on an old channel, a delay is experienced between transmitting the last frame on the old channel and transmitting the first frame on the new channel, where the delay varies based on the implementation of the AP and any CAC that must be performed on the new channel before broadcasting. Therefore, embodiments of the present invention provide an expected channel switch time element, for example, in a beacon frame or probe response frame.

20 Claims, 7 Drawing Sheets

(56) References Cited

U.S. PATENT DOCUMENTS

| | | | |
|---|---|---|---|
| 2013/0171116 A1 | 7/2013 | Shoham et al. | |
| 2013/0336140 A1* | 12/2013 | Ma | H04W 76/20 370/252 |
| 2014/0183400 A1 | 7/2014 | Ji et al. | |
| 2016/0073414 A1* | 3/2016 | Li | H04W 16/14 370/330 |
| 2016/0183172 A1* | 6/2016 | Lee | H04W 48/06 370/329 |
| 2016/0234862 A1 | 8/2016 | Seok | |
| 2016/0249357 A1 | 8/2016 | Green et al. | |
| 2018/0295538 A1* | 10/2018 | Monajemi | H04W 4/21 |

* cited by examiner

METHOD AND APPARATUS FOR ADVERTISING CHANNEL SWITCH TIME IN A WIRELESS TRANSMISSION SYSTEM

CROSS-REFERENCE TO RELATED APPLICATIONS

This application claims the benefit of and priority to provisional patent application Ser. No. 62/617,657, with filing date Jan. 16, 2018, and hereby incorporated by reference in its entirety.

FIELD

Embodiments of the present invention generally relate to the field of wireless communications. More specifically, embodiments of the present invention relate to systems and methods for efficiently managing the channel selection of a wireless access point in response to interference.

BACKGROUND

The 2.4 GHz and 5 GHz Wi-Fi signal ranges are divided into a series of smaller channels, and Wi-Fi network equipment (e.g., a wireless access point or station) is able to communicate data using these channels. When a wireless AP is transmitting data, different channels may be effected by different sources of wireless interference, and the type and amount of interference may change over time. Therefore, a typical wireless AP will switch channels intermittently based on the levels of interferences detected on the current channel. When the AP decides to change to a different channel in response to interference, the AP transmits a series of beacons indicating the number of beacons that will be transmitted on the old channel before the AP switches to the new channel and sends a beacon in the new channel. Beacons are special frames that announce the presence of the AP on the channel and indicate certain characteristics of the wireless network. When the countdown ends, the AP stops broadcasting on the current channel, and the wireless stations connected to the AP will begin listening for a beacon in the new channel. However, in some cases, the time between when the AP stop broadcasting in the current channel and begins broadcasting on the new channel may be quite long or unpredictable in length, or a beacon frame counting down the channel switch to the new channel may be missed, and therefore a wireless station may be unsure if the station should wait longer for the AP to appear or start searching for a AP. This delay and uncertainty may cause transmission interruptions or the clients to roam to a suboptimal AP.

Moreover, Dynamic Frequency Selection (DFS) allows unlicensed devices, such those operating in large out-door areas, airports, etc., to share the frequency bands which have been allocated to radar systems without causing interference to those radars. To use these specific DFS frequencies without interfering with radar use, different jurisdictions have enacted rules that require a wireless AP to perform a channel availability check (CAC) for a predetermined period of time (e.g., 60 seconds) to determine if a waveform is broadcast on the channel having an energy level above a given threshold. However, in some cases, a wireless station connected to the AP may not be able to wait for the channel availability check to be completed before sending and/or receiving new data. This is due in part to the fact that the wireless STA has no way of knowing how long the CAC is expected to take. When a wireless STA stops receiving beacons from an AP, during a CAC, for example, the STA may decide to switch to a suboptimal AP instead of waiting for the AP to appear after the CAC has been completed.

SUMMARY

Accordingly, what is needed is a method for providing wireless stations with information indicating when the wireless AP will begin broadcasting on the new channel to improve the efficiency of wireless networks.

Embodiments of the present invention provide a method and apparatus for announcing the expected delay period between when a wireless AP stops transmitting on a first channel and begins transmitting on a second channel. This delay period can then be used by a wireless station to help that wireless station in the decision of waiting for the AP in the new channel or start looking for a new AP. The AP first advertises its intention to switch channels and transmits a number of beacon frames in the old channel counting down to the channel switch time. After the last beacon frame is sent in the old channel, a delay is experienced between transmitting the last frame in the old channel and transmitting the first frame in the new channel, where the delay varies based on the implementation of the AP and any regulatory imposed waiting time or CAC time that must be performed on the new channel before broadcasting. Therefore, embodiments of the present invention provide an expected channel switch time element or field, for example, in a beacon frame or probe response frame. In this way, wireless STAs connected to the wireless AP know how long the delay is expected to take at the new channel and can act and/or wait accordingly.

According to one embodiment, a method of advertising a channel switch time is disclosed. The method includes, using a wireless access point, transmitting first data to a wireless station over a first wireless channel, and broadcasting a channel switch announcement comprising a channel switch time, where the channel switch announcement indicates that said wireless access point will perform a channel switch to begin transmitting over a second wireless channel. After a time delay approximately equal to a value of said channel switch time, transmitting second data to over the second wireless channel.

According to one embodiment, the method includes detecting an energy level of said first channel above a threshold.

According to one embodiment, the method includes transmitting a series of beacons on the first channel for counting down to the channel switch using the wireless access point.

According to one embodiment, the channel switch announcement is broadcast in a beacon frame.

According to one embodiment, the channel switch announcement is broadcast in a probe response frame.

According to one embodiment, the method includes performing a channel availability check (CAC) over said second channel using said wireless access point, wherein said time delay is approximately equal to a time required to perform the CAC.

According to another embodiment, the wireless access point includes a first radio and a second radio, the transmitting first data uses the first radio, and the performing a CAC over said second channel uses the second radio.

According to another embodiment, a device for advertising a channel switch time is disclosed. The device includes a memory for storing data, and a processor communicatively coupled to the memory and configured to execute instructions for performing a method for advertising a channel switch time. The method includes transmitting first data over a first wireless channel, broadcasting a channel switch announcement comprising a channel switch time element, wherein the channel switch announcement indicates that said device will perform a channel switch to begin transmitting over a second wireless channel, and after a time delay approximately equal to a value of said channel switch time element, transmitting second data to over the second wireless channel.

According to another embodiment, a method of connecting to a wireless access point after a channel switch is disclosed. The method includes, using a wireless station, receiving first data from a wireless access point over a first wireless channel and receiving a channel switch time from the wireless access point, where the channel switch time indicates an expected delay between when said wireless access point stops transmitting on said first wireless channel and begins transmitting over a second wireless channel, after a period of time approximately equal to a value of said channel switch time, and connecting to the wireless access point over the second wireless channel.

According to some embodiments, the channel switch time is included in a channel switch announcement.

According to some embodiments, the method includes broadcasting a probe request over the first wireless network, wherein said channel switch time is included in a response to the probe request received from the wireless access point.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
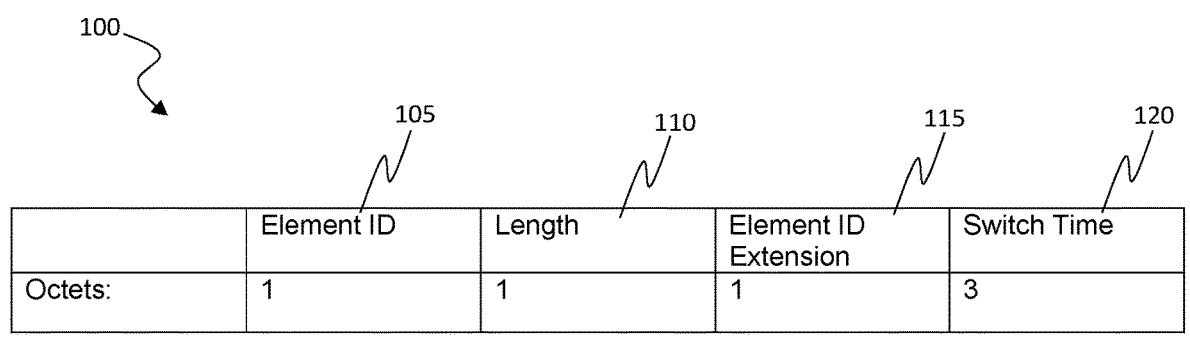
FIG. 1A is a block diagram of data fields of an exemplary Max Channel Switch Time information element according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 2, 3, and 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Channel Switch Announcement with Channel Switch Time

Embodiments of the present invention provide a method and apparatus for announcing the expected delay period between when a wireless AP stops transmitting on a first channel and begins transmitting on a second channel. The AP first advertises its intention to switch channels and transmits a number of beacon frames on the old channel counting down to the channel switch time. After the last beacon frame is sent on the old channel, a delay is experienced between transmitting the last frame on the old channel and transmitting the first frame on the new channel. The delay varies based on the implementation of the AP and also any CAC that must be performed on the new channel before broadcasting. Therefore, embodiments of the present invention provide an expected channel switch time element or field, for example, in a beacon frame or probe response frame. In this way, wireless STAs connected to the wireless AP know how long the delay is expected to take and can act accordingly (e.g., not give up too soon when waiting for the new channel beacon communication).

When the AP has chosen to transmit over DFS regulation, certain prerequisites for operation defined by regulatory bodies often require a delay of a certain period of time before the AP can operate on the new channel, leaving STAs currently connected to the AP to wait for the AP to start operating on a new channel, if possible, or to seek a new AP to access if the station is unable to wait for the requisite time. In the United States, when an AP has selected to operate on a new DFS channel, the AP must wait at least 60 seconds after it stops operating on the old channel before the AP can begin operating on the new DFS channel. During the 60 seconds, the AP performs a CAC on the new channel to determine if the channel is clear from radar broadcasts which have priority over other communications. In the EU, an AP connecting to a new DFS channel is required to wait between 60 seconds and 10 minutes after it stops operating on the old channel before the AP can begin operating on the new channel when operating without CAC clearance. Moreover, even for channels not regulated under DFS, an AP may need a certain period of time before broadcasting on a new channel depending on the specific implementation of the AP.

Therefore, embodiments of the present invention provide a new information element or field that is within a beacon frame sent by an AP that intends to switch channels and the field indicates the expected delay between the time that the AP stops operating on the old channel and begins operating on the new channel. In this way, wireless stations connected to the AP know how long the delay is expected to be and can choose to wait for the AP to come online or seek a new AP and importantly to not give up too soon waiting for the new beacon for the new channel. For example, for a wireless device that is currently in a low-power or standby mode, a delay of up to 60 seconds may be acceptable because the wireless device does not currently need to send or receive data. Even for devices that are actively sending and receiving data, a one or two second delay may be acceptable. In the case of a CAC for operating on a DFS channel, the information element broadcast in a beacon indicates how long the AP will take to start operating in the new channel, so that stations can decide to wait for the AP or connect to a different station immediately.

In some cases, when an AP is moving to a new channel that is not a DFS channel, no CAC is required and the AP can begin transmitting on the new channel with less delay. However, an AP may still need a certain period of time (e.g., 1 or 2 seconds) before broadcasting on a new channel depending on the specific implementation of the AP. Therefore, a STA can listen for a beacon frame broadcast by the AP, or the STA can broadcast probe response frames to determine if the AP is active on a given channel. Furthermore, embodiments of the present invention provide a new information element in a beacon frame sent by an AP that intends to switch channels indicating the expected delay between the time that the AP stops operating on the old channel and begins operating on the new channel. In this way, the STA can decide to wait for the AP to begin broadcasting on the new channel or to search for another AP.

With regard to FIG. 1A, an exemplary Max Channel Switch Time information element or field 100 is depicted according to embodiments of the present invention. The information element 100 is provided in a beacon frame broadcast by the wireless AP. The information element or field 100 includes an Element ID 105, a length field 110, an Element ID extension 115, and a Switch Time 120. The Switch Time 120 is a three octet field indicating the maximum time difference between the time the last beacon is transmitted by the AP in the current channel and the expected time of the first beacon transmitted by the AP in the new channel expressed in microseconds. The length field 110 has a fixed value of 4. The Element ID 105 is used to identify the element as the Max Channel Switch Time information element.

Figure 1B:
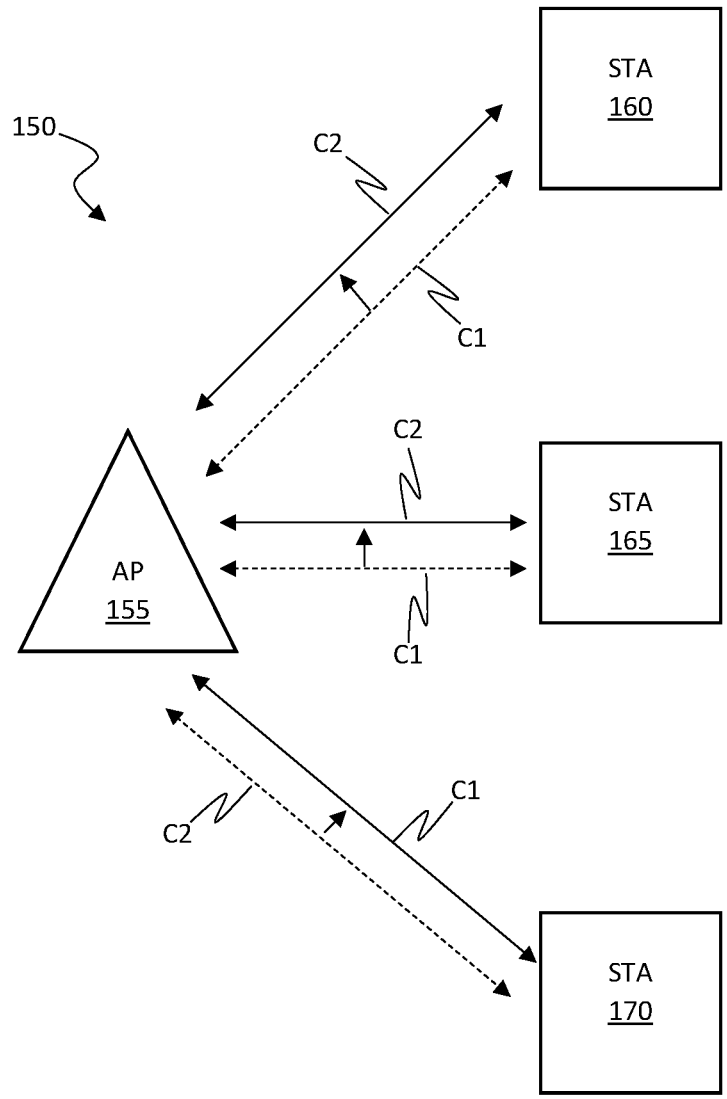
FIG. 1B is a block diagram of an exemplary wireless network according to embodiments of the present invention

With regard to FIG. 1B, a block diagram of an exemplary wireless network 150 is depicted according to embodiments of the present invention. The wireless network 150 includes a wireless access point 155 in communication with wireless stations 160, 165, and 170 over wireless channel C1. The wireless access point 155 performs a channel switch to wireless channel C2 responsive to determining the existence of interference in channel C1. Before transmitting on wireless channel C2, the wireless access point C1 may perform a CAC to determine if wireless channel C2 is available for transmission, and sends a Channel Switch Announcement including a Switch Time element or field as depicted in FIG. 1A to advertise the time difference between the time the last beacon is transmitted by the wireless access point 155 over wireless channel C1 and the expected time of the first beacon transmitted by the wireless access point 155 on wireless channel C2.

Figure 1C:
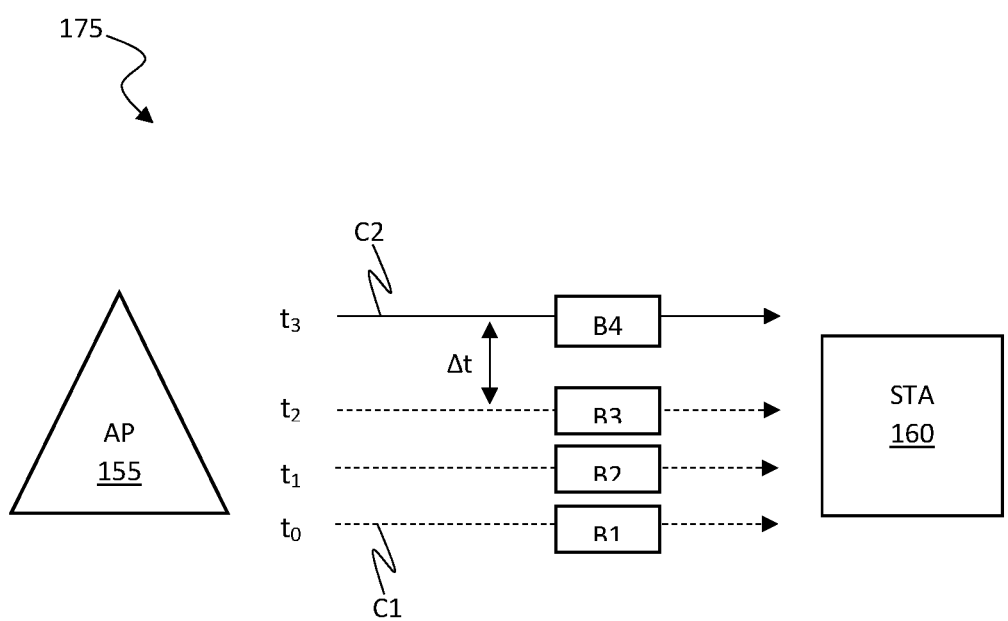
FIG. 1C is a wireless transmission diagram of an exemplary wireless access point transmitting a series of beacon frames for performing a channel switch according to embodiments of the present invention.

As depicted by wireless transmission diagram 175 in FIG. 1C, the wireless access point 155 can send one or more frames (e.g., a beacon frame or a probe response frame) indicating that the wireless access point 155 is switching to wireless channel C2. For example, beacon frames B1, B2, and B3 can include the Channel Switch Announcement and count down the number of remaining beacon frames until the channel switch. For example, beacon frame B1 sent at time $t_0$ indicates that two more beacon frames will be sent before the channel switch, beacon frame B2 sent at time $t_1$ indicates that one more beacon frames will be sent before the channel switch, and beacon frame B3 sent at time $t_2$ indicates that no more beacon frames will be sent before the channel switch. The wireless access point 155 then stops transmitting on wireless channel C1, and after a time period At approximately equal to the time delay included in the Switch Time element of the Channel Switch Announcement, the wireless access point 155 begins transmitting on the second wireless channel (e.g., transmits beacon frame B4) at time $t_3$.

Figure 2:
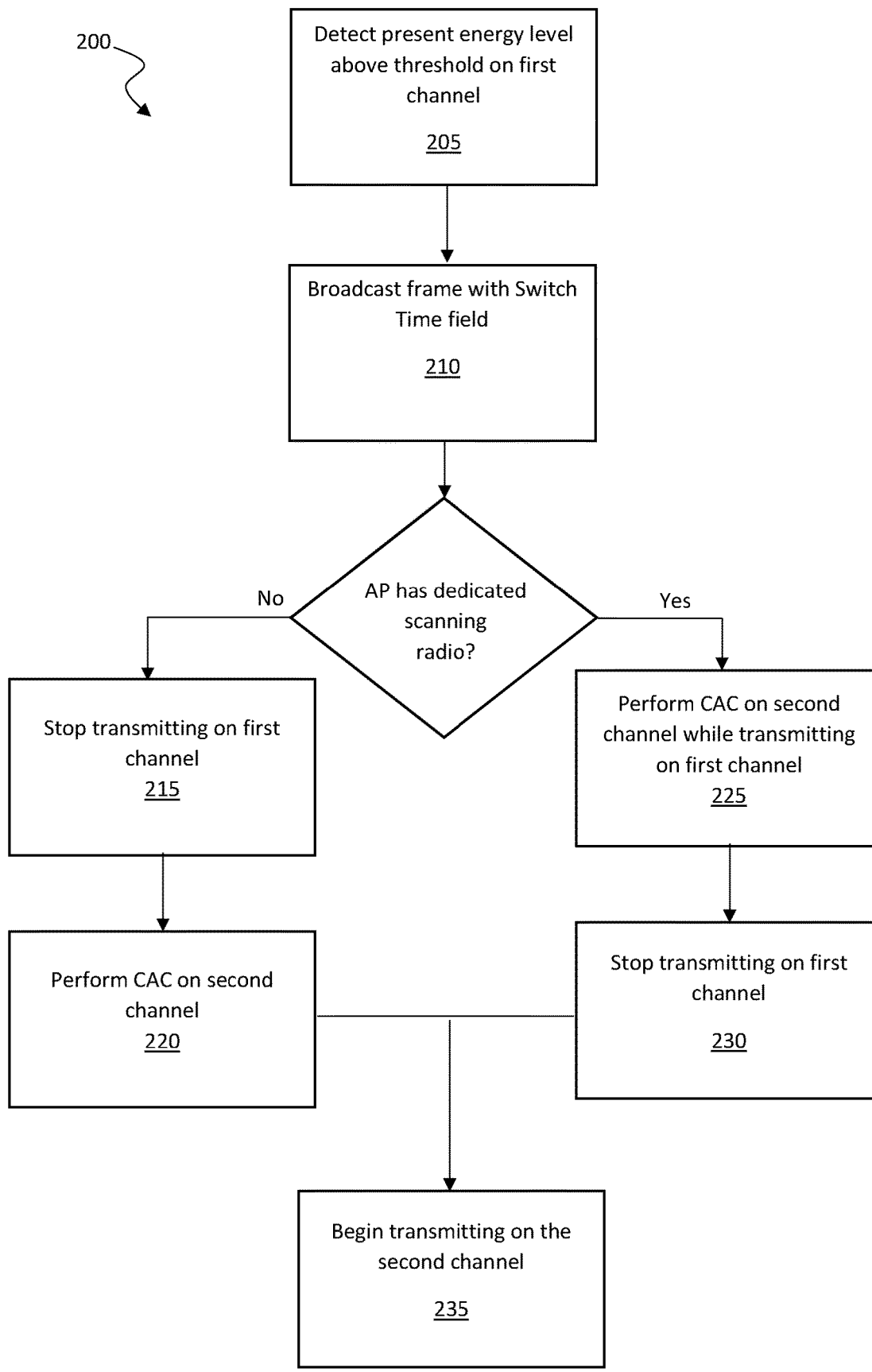
FIG. 2 is a flow chart of an exemplary sequence of computer implemented steps for performing a DFS channel switch for a wireless AP according to embodiments of the present invention.

With regard to FIG. 2, an exemplary sequence of computer implemented steps 200 for performing a DFS channel switch for a wireless AP is depicted according to embodiments of the present invention. At step 205, the wireless AP detects interference in channel C1 and decides to switch channels. At step 210, the wireless AP broadcasts a frame (e.g., a beacon frame or probe response frame) including a Channel Switch Announcement element and a Max Channel Switch Time element. The Channel Switch Announcement element indicates which channel the AP intends to switch to, and the Max Channel Switch Time element includes a Switch Time field indicating the maximum expected delay between the time that the AP stops operating on the first channel and begins operating on the second channel. At step 215, for a wireless AP that does not include a dedicated scanning radio, the wireless AP ceases transmission on the first wireless channel, and at step 220, the wireless AP performs a CAC on the second channel. After a time period approximately equal to the time delay included in the Switch Time element, at step 235, the AP begins transmitting on the second wireless channel (e.g., transmits a beacon frame).

Subsequent to step 210, for a wireless AP that includes a dedicated scanning radio, the wireless AP continues transmitting on the first wireless channel and simultaneously performs a CAC on the second wireless channel at step 225. After a time period approximately equal to the time delay included in the Switch Time element, at step 230, the AP stops transmitting on the first wireless channel. At step 235, the wireless AP begins transmitting on the second wireless channel (e.g., transmits a beacon frame).

Figure 3:
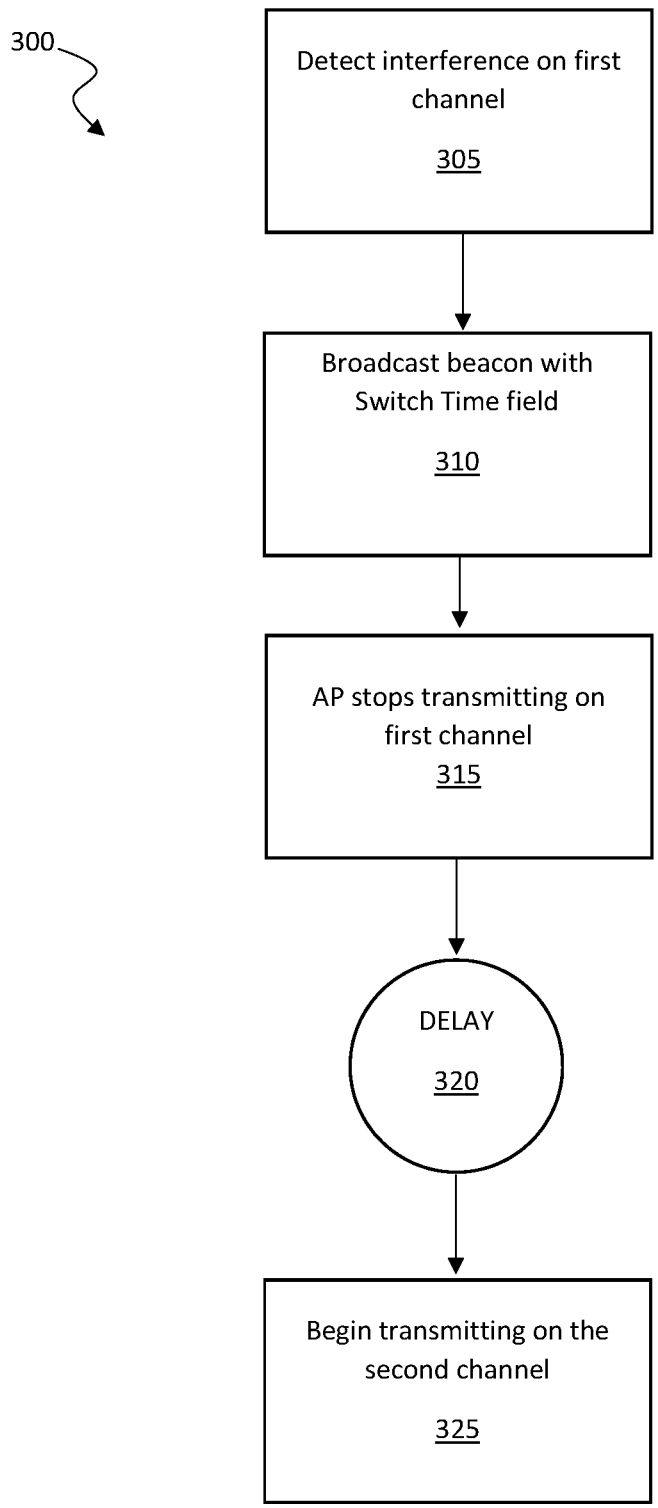
FIG. 3 is a flow chart of an exemplary sequence of computer implemented steps for performing a DFS channel switch for a wireless AP according to embodiments of the present invention.

With regard to FIG. 3, an exemplary sequence of computer implemented steps 300 for performing a channel switch (e.g., a non-DFS channel switch) for a wireless AP is depicted according to embodiments of the present invention. At step 305, the wireless AP detects interference on a first channel above an energy threshold and decides to switch channels. At step 310, the wireless AP broadcasts a beacon frame including a Channel Switch Announcement element and a Max Channel Switch Time element. The Channel Switch Announcement element indicates which channel the wireless AP intends to switch to, and the Max Channel Switch Time element includes a Switch Time field indicating the maximum expected delay between the time that the wireless AP stops operating on the first channel and begins operating on the second channel. At step 315, the wireless AP ceases transmission on the first wireless channel. At step 320, the wireless AP experiences a delay while switching channels. After a time period approximately equal to the time delay included in the Switch Time element, at step 325, the wireless AP begins transmitting on the second wireless channel (e.g., transmits a beacon frame). The exact length of the delay 320 is based on the specific implementation of the wireless AP.

Figure 4:
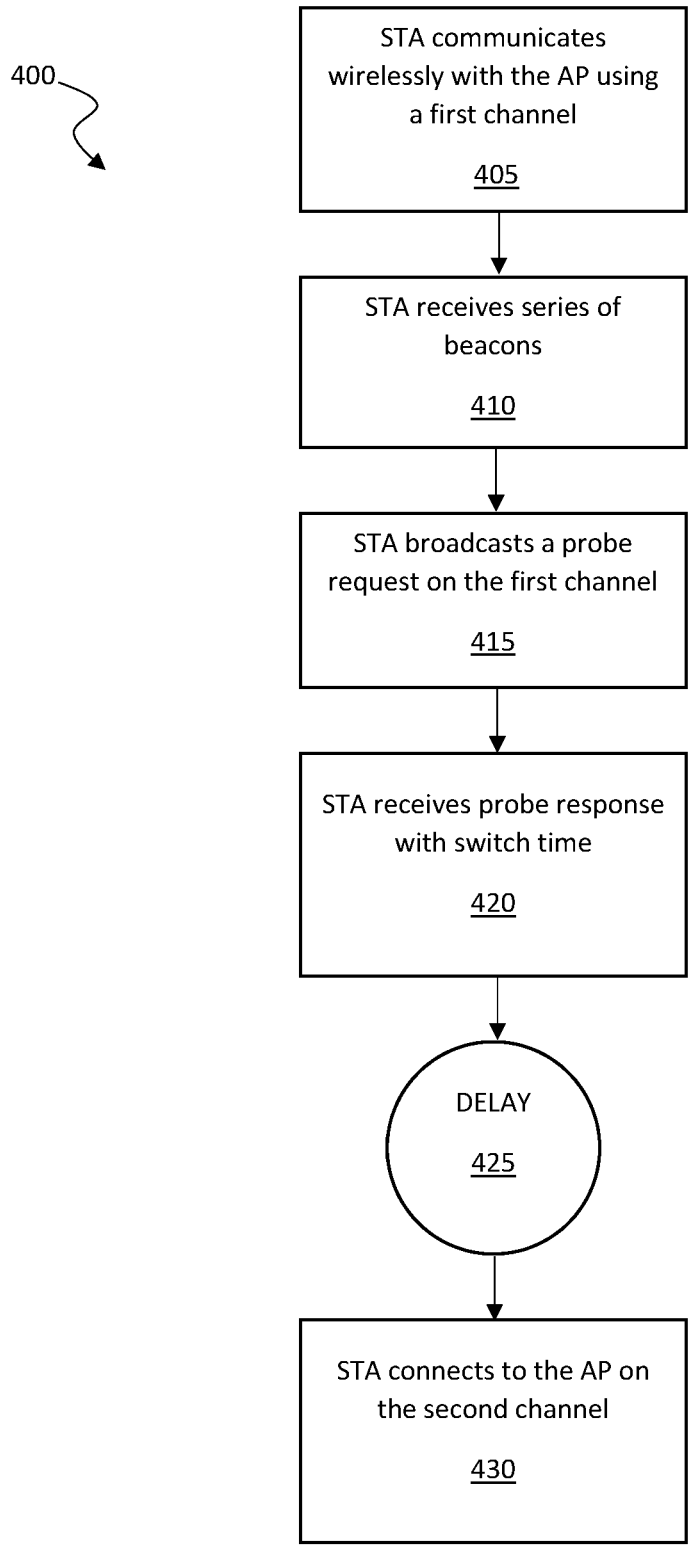
FIG. 4 is a flow chart of an exemplary sequence of computer implemented steps for connecting a wireless STA to a wireless AP after performing a non-DFS channel switch according to embodiments of the present invention.

With regard to FIG. 4, an exemplary sequence of computer implemented steps 400 for connecting a wireless STA to a wireless AP performing a non-DFS channel switch is depicted according to embodiments of the present invention. At step 405, the wireless STA communicates wirelessly with the wireless AP using a first channel. At step 410, the wireless STA receives a series of beacon frames that count down to the time when the AP will stop broadcasting on the first channel. At step 415, the wireless STA broadcasts a probe request on the first channel. For example, the wireless STA may broadcast a probe request after missing one or more beacon frames transmitted by the wireless AP. At step 420, the wireless STA receives a probe response frame from the wireless AP including a Max Channel Switch Time element with a Switch Time field indicating the maximum expected delay between the time that the AP stops operating on the first channel and begins operating on a second channel. At step 425, the wireless AP experiences a delay while switching channels. At step 430, after a period of time approximately equal to the value of the Switch Time field, the wireless STA connects to the wireless AP on the second channel.

When moving to a new channel, the wireless AP informs all associated STAs that the AP is moving to a new channel and maintains the association by advertising the channel switch using a Channel Switch Announcement element in beacon frames, probe response frames, or Channel Switch Announcement Frames until the intended channel switch time. Moreover, the AP may require STAs in the basic service set (BSS) to stop transmission until the channel switch takes place by setting a Channel Switch Mode field in the Channel Switch Announcement Element to 1. Specifically, the channel switch is scheduled at a time when all STAs in the BSS, including STAs in power saving mode, have an opportunity to receive at least one Channel Switch Announcement element prior to the channel switch.

According to some embodiments, when the AP sets the Channel Switch Count field of a Channel Switch Announcement element to a non-zero value in a beacon frame, the AP includes a Max Channel Switch Time element in the beacon frame. When the AP includes the Max Channel Switch Time element in the beacon frame, the AP must transmit the first beacon frame in the new channel no later than the time indicated in the Switch Time field of the Max Channel Switch Time element after the last beacon frame transmitted in the current channel, unless the AP determines that it is unable to operate on the new channel.

According to some embodiments, when the AP sets the value of the Channel Switch Count field of the Channel Switch Announcement element to zero, the AP does not include the Max Channel Switch Announcement element into the beacon frame.

According to some embodiments, when a dot 11 ExtendedChannelSwitchActivated element is set to true, the AP must inform the associated STAs that the AP is moving to a new channel and/or operating class and maintain the association by advertising the switch using Extended Channel Switch Announcement elements in any transmitted beacon frames, probe response frames, and extended channel switch announcement frames.

Moreover, the AP may request STAs in the BSS to stop transmissions until the channel switch takes place by setting the Extended Channel Switch Mode field to 1 in the Extended Channel Switch Announcement element. If possible, the channel switch is scheduled so that all STAs in the BSS, including STAs in power save mode, have the opportunity to receive at least one Extended Channel Switch Announcement element before the switch. When both the Extended Channel Switch Announcement and the Channel Switch Announcement elements are transmitted in Public Action frames, they are sent in separate frames.

According to some embodiments, when the AP sets the Channel Switch Count field of an Extended Channel Switch Announcement element to a non-zero value in a Beacon frame, it also includes a Max Channel Switch Time element in that Beacon frame.

According to some embodiments, when the AP includes the Max Channel Switch Time element with the Extended Channel Switch Announcement element in the Beacon frame, the AP transmits the first Beacon frame in the new channel no later than the time indicated in the Switch Time field of the Max Channel Switch Time element after the last Beacon frame transmitted in the current channel, unless the AP determines that it is unable to operate on the new channel.

According to some embodiments, when the AP sets the value of the Channel Switch Count field of the Extended Channel Switch Announcement element to zero, it does not include the Max Channel Switch Announcement element into the beacon frame.

Exemplary Computer System

Embodiments of the present invention are drawn to electronic systems for automatically advertising the expected delay when performing a channel switch using a wireless AP. The following discussion describes one such exemplary electronic system or computer system can be used as a platform for implementing embodiments of the present invention.

Figure 5:
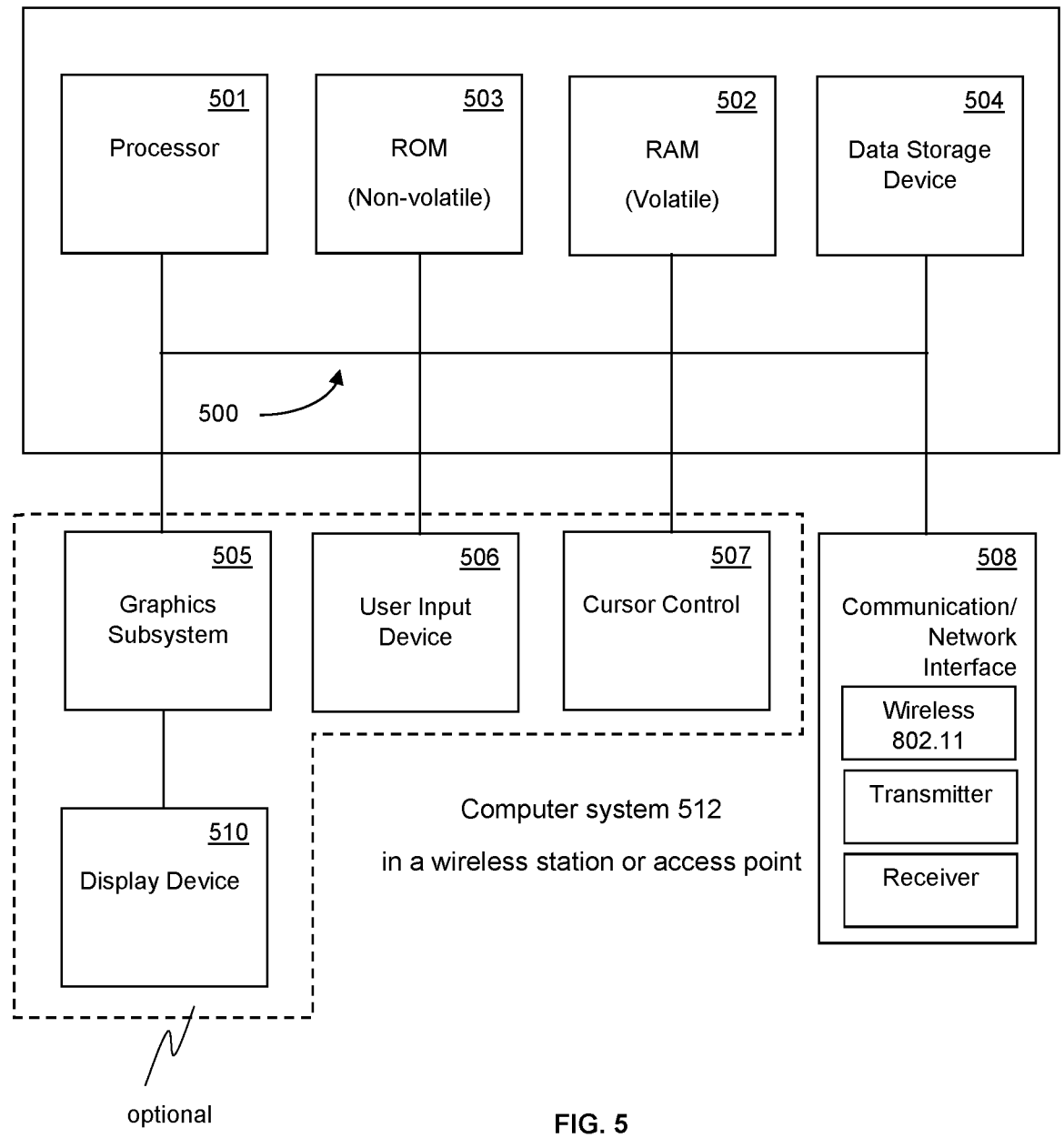
FIG. 5 is a block diagram of an exemplary computer system upon which embodiments of the present invention may be implemented.

In the example of FIG. 5, the exemplary computer system 512 (e.g., a wireless access point or wireless station) includes a central processing unit (CPU) 501 for running software applications and optionally an operating system. Random access memory 502 and read-only memory 503 store applications and data for use by the CPU 501. Data storage device 504 provides non-volatile storage for applications and data and may include fixed disk drives, removable disk drives, flash memory devices, and CD-ROM, DVD-ROM or other optical storage devices. The optional user inputs 506 and 507 comprise devices that communicate inputs from one or more users to the computer system 512 (e.g., mice, joysticks, cameras, touch screens, and/or microphones).

A communication or network interface 508 includes a transceiver and allows the computer system 512 to communicate with other computer systems, networks, or devices via an electronic communications network, including wired and/or wireless communication and including an Intranet or the Internet (e.g., 802.11 wireless standard). The optional display device 510 may be any device capable of displaying visual information in response to a signal from the computer system 512 and may include a flat panel touch sensitive display, for example. The components of the computer system 512, including the CPU 501, memory 502/503, data storage 504, user input devices 506, and graphics subsystem 505 may be coupled via one or more data buses 500.

In the embodiment of FIG. 5, an optional graphics subsystem 505 may be coupled with the data bus and the components of the computer system 512. The graphics system may comprise a physical graphics processing unit (GPU) 505 and graphics/video memory. GPU 505 may include one or more rasterizers, transformation engines, and geometry engines, and generates pixel data from rendering commands to create output images. The physical GPU 505 can be configured as multiple virtual GPUs that may be used in parallel (e.g., concurrently) by a number of applications or processes executing in parallel, or multiple physical GPUs may be used simultaneously. Graphics sub-system 505 outputs display data to optional display device 510. The display device 510 may be communicatively coupled to the graphics subsystem 505 using HDMI, DVI, DisplayPort, VGA, etc.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of advertising a channel switch time, the method comprising:

using a wireless access point, transmitting first data over a first wireless channel;

using the wireless access point, broadcasting a channel switch announcement comprising:
  a channel switch time, wherein the channel switch announcement indicates that said wireless access point will perform a channel switch to begin transmitting over a second wireless channel; and
  an expected delay between a time that the wireless access point stops using the first wireless channel and begins using the second wireless channel,
wherein the wireless access point is operable to transmit second data over the first wireless channel subsequent to transmitting said channel switch announcement and before performing said channel switch;
using the wireless access point, performing the channel switch from said first wireless channel to said second wireless channel; and
after a time delay approximately equal to a value of said channel switch time and after performing said channel switch, transmitting third data over the second wireless channel,
wherein the first wireless channel and the second wireless channel are not used simultaneously by the wireless access point when transmitting said second or third data.

2. The method as described in claim 1, further comprising detecting interference in said first channel above a threshold, wherein said channel switch is performed responsive to said detecting an energy level of said first channel above a threshold.

3. The method as described in claim 1, further comprising transmitting a series of beacons on the first channel for counting down to the channel switch using the wireless access point.

4. The method as described in claim 1, wherein said channel switch announcement is broadcast in a beacon frame and further comprises an identification of said second wireless channel.

5. The method as described in claim 1, wherein said channel switch announcement is included in a probe response frame.

6. The method as described in claim 1, further comprising performing a channel availability check (CAC) over said second channel using said wireless access point, wherein said time delay is approximately equal to a time required to perform the CAC.

7. The method as described in claim 6, wherein said wireless access point comprises a first radio and a second radio, wherein said transmitting first data uses said first radio, and wherein said performing a CAC over said second channel uses said second radio.

8. A device for advertising a channel switch time, the device comprising:

a memory for storing data; and a processor communicatively coupled to the memory and configured to execute instructions for performing a method for advertising a channel switch time, the method comprising:
  transmitting first data over a first wireless channel;
  broadcasting a channel switch announcement comprising a channel switch time element, wherein the channel switch announcement indicates that said device is to perform a channel switch to begin transmitting over a second wireless channel and an expected time delay of the channel switch,
wherein the processor is operable to transmit second data over the first wireless channel subsequent to transmitting said channel switch announcement and before performing said channel switch;

performing the channel switch from said first wireless channel to said second wireless channel; and after a time delay approximately equal to said expected time delay and after performing said channel switch, transmitting third data over the second wireless channel, wherein the first wireless channel and the second wireless channel are not used simultaneously by the wireless access point when transmitting said second or third data.

9. The device as described in claim 8, wherein the method further comprises detecting an energy level of said first channel above a threshold, wherein said channel switch is performed responsive to said detecting an energy level of said first channel above a threshold.

10. The device as described in claim 8, wherein the method further comprises transmitting a series of beacons on the first channel for counting down to the channel switch using the device.

11. The device as described in claim 8, wherein said channel switch announcement is broadcast in a beacon frame and further comprises an identification of said second wireless channel.

12. The device as described in claim 8, wherein said channel switch announcement is included in a probe response frame.

13. The device as described in claim 8, wherein the method further comprises performing a channel availability check (CAC) over said second channel using said device, wherein said time delay is approximately equal to a time required to perform the CAC.

14. The device as described in claim 13, wherein said wireless access point comprises a first radio and a second radio, wherein said transmitting first data uses said first radio, and wherein said performing a CAC over said second channel uses said second radio.

15. A method of connecting to a wireless access point after a channel switch, the method comprising:

using a wireless station, receiving first data from a wireless access point over a first wireless channel;

using the wireless station, receiving a channel switch time from the wireless access point, wherein the channel switch time indicates an expected delay between when said wireless access point stops transmitting on said first wireless channel and begins transmitting over a second wireless channel, wherein the wireless station is operable to transmit second data over the first wireless channel subsequent to receiving said channel switch time and before performing said channel switch;

waiting for a period of time approximately equal to a value of said channel switch time; and connecting to the wireless access point over the second wireless channel after performing said channel switch, wherein the first wireless channel and the second wireless channel are not used simultaneously by the wireless access point when transmitting said second or third data.

16. The method as described in claim 15, wherein said channel switch time is included in a channel switch announcement.

17. The method as described in claim 16, wherein said channel switch announcement is included in a beacon frame.

18. The method as described in claim 15, further comprising broadcasting a probe request over the first wireless network, wherein said channel switch time is included in a response to the probe request received from the wireless access point.

19. The method as described in claim 15, further comprises receiving a series of beacons on the first channel, wherein said series of beacons counts down to the channel switch.

20. The method as described in claim 15, wherein said wireless access point performs a channel availability check before transmitting over the second wireless channel.

* * * * *